(12) United States Patent
Wolters et al.

(10) Patent No.: US 6,430,907 B2
(45) Date of Patent: Aug. 13, 2002

(54) INTAKE AND PLUCKING ARRANGEMENT AS WELL AS A HARVESTING MACHINE

(75) Inventors: Norbert Wolters, Gescher; Richard Wübbels, Rhede, both of (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/731,378

(22) Filed: Dec. 6, 2000

(30) Foreign Application Priority Data

Dec. 9, 1999 (DE) .......................................... 199 59 338

(51) Int. Cl.[7] .............................................. A01D 45/02
(52) U.S. Cl. ................................................ 56/64; 56/60
(58) Field of Search ................................ 56/14.3–14.6, 56/13.9, 60, 64, 94, 98, 103, 106, 109, 119, 113–118, 500, 503

(56) References Cited

U.S. PATENT DOCUMENTS

| | | | |
|---|---|---|---|
| 3,623,298 A | | 11/1971 | Hitzhusen |
| 4,236,369 A | * | 12/1980 | Decoene ........................ 56/60 |
| 4,553,379 A | * | 11/1985 | Kalverkamp ................... 56/60 |
| 4,594,842 A | | 6/1986 | Komamura et al. |
| 4,926,623 A | | 5/1990 | Fiener |
| 5,287,687 A | * | 2/1994 | Urich et al. ................ 56/327.1 |
| 5,651,243 A | | 7/1997 | Arnold et al. |
| 5,722,225 A | | 3/1998 | Wuebbels et al. |
| 6,298,643 B1 | * | 10/2001 | Wuebbels et al. ............. 56/60 |

FOREIGN PATENT DOCUMENTS

| | | |
|---|---|---|
| AT | 366 874 | 5/1982 |
| DE | 30 29 424 | 2/1981 |
| DE | 195 31 918 | 3/1997 |
| DE | 197 34 747 | 2/1999 |
| FR | 74 965 | 12/1961 |

* cited by examiner

*Primary Examiner*—Robert E. Pezzuto (57) ABSTRACT

A self-propelled forage harvester is equipped with a header including intake and plucking arrangements which, in the case of corn, separate the ears from the stalk and conveys them in different streams to the harvester. The harvester has a conventional cutter drum that receives the stalks and cuts them into short lengths, and has a hammermill which receives the corn ears and chops them into small pieces. The corn stalk pieces and the chopped ears can be recombined and discharged from the harvester into a trailer as whole plant silage, or can be delivered in separate streams to separate trailers or separate containers of the same trailer.

13 Claims, 6 Drawing Sheets

INTAKE AND PLUCKING ARRANGEMENT AS WELL AS A HARVESTING MACHINE

The invention concerns a corn harvesting machine equipped with a header having the ability to separate corn ears from the stalk and to process these separately from the remainder of the plant.

BACKGROUND OF THE INVENTION

DE 197 34 747 A describes a corn harvesting front attachment or header for attachment to a self-propelled harvesting machine, that can mow, independent of row arrangement, and pluck the corn ears from the plants, in order to process them separately from the rest of the plant, for example, to thresh them out. For the grasping and mowing of the plants independent of rows, the implement is provided with a mower head with conveyor disks rotating and arranged above one another provided with recesses in their outer circumference with a knife arranged below it, as is known practice in corn heads. The plants are conducted to conventional plucking devices attached downstream of the mower head as they are described in DE 30 29 424 A.

The disadvantage here is seen in the fact that the conveyor disks equipped with recesses do not always reliably perform the transport of the plants. In particular, plants that stand at an inclination cannot be grasped.

SUMMARY OF THE INVENTION

According to the present invention there is provided an improved header of the rowless type.

A broad object of the invention is to provide a header which is capable of recovering crop having stalks which stand at an inclination.

DESCRIPTION OF THE PREFERRED EMBODIMENT

Figure 1:
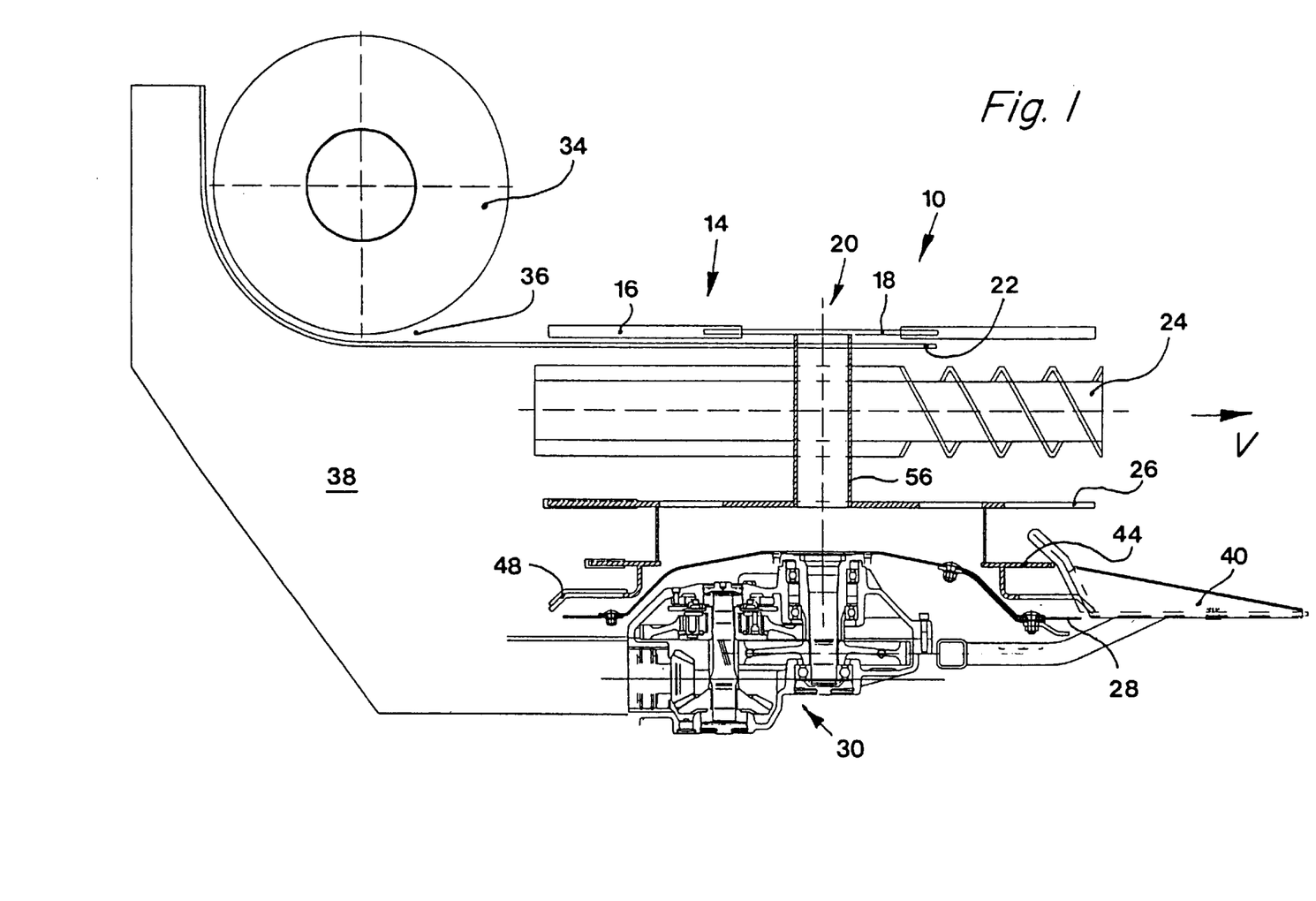
FIG. 1 is a longitudinal, vertical sectional view through an intake and plucking arrangement.

Referring now to FIG. 1, there is shown an intake and plucking or ear snapping arrangement 1, which, in its basic configuration, consists of an upper transport element 14, a conveyor disk assembly with an upper conveyor disk 26 and a lower conveyor disk 44, as well as a plucking arrangement with a sheet-metal stripper vane 22, first and second plucking rolls 24 and 52, as well as a rotating knife 28. The intake and plucking arrangement 10 is arranged to be driven ahead along the forward operating direction V and to cut plants standing on a field from the ground, to separate their useful components by means of the plucking arrangement from the remainder of the plant, to transport the useful components by means of a first screw conveyor 34 extending in the transverse direction into a vehicle for further processing as well as also to transport away the remainder of the plants through a further channel 38.

The upper transport element 14 is used to grasp and draw in the plants and includes a flat disk 18 with fingers 16 fastened to its outer circumference, the fingers 16 extending generally radially outward. The fingers 16 are in themselves curved in the trailing direction with respect to the direction of rotation of the upper transport element 14 which rotates counterclockwise in FIG. 2 so that the leading surface exhibits a rejecting conveying performance. Plant components, in particular stalks, that possibly reach the operating region of the fingers 16 are therefore forced to the outside by the leading surface of the fingers 16. The trailing (rear) surfaces of the fingers 16 operate as aggressive conveying elements by reason of their curvature, and hence draw plant components coming into contact with them inward.

Figure 5:
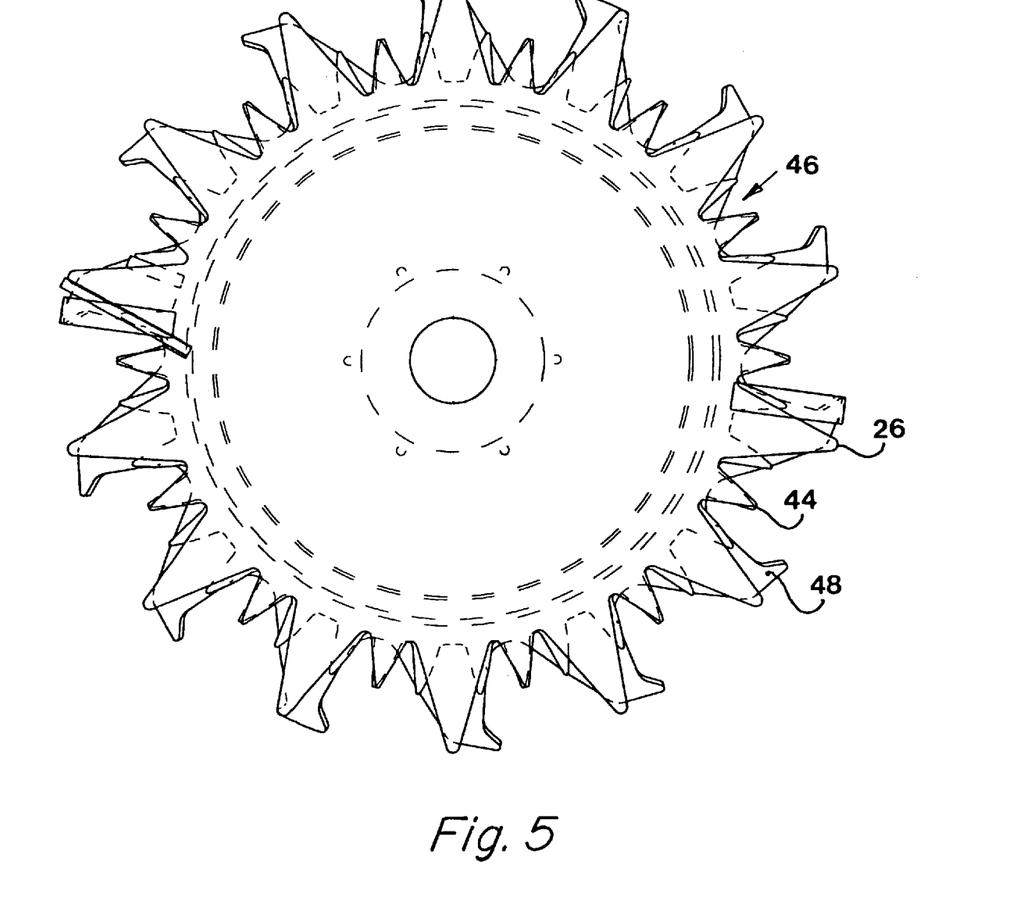
FIG. 5 is a top plan view of the conveyor disk assembly of FIG. 4.

The upper transport element 14 is arranged coaxially to and above a conveyor disk assembly with an upper conveyor disk 26 and a lower conveyor disk 44 below it and again below these a driver disk 48 with projecting hook-shaped drivers. Such conveyor disk assemblies are known in themselves from corn heads. As can best be seen from FIG. 5, the upper conveyor disk 26 is equipped on its outer circumference with pocket-shaped recesses 25 46, that are used to engage parts of plants, in particular stalks. The recesses 46 are generally semi-circular, and at the root of each recess, a tooth is arranged in each case. Semi-circular recesses with projecting elements arranged on the trailing edge, as illustrated in DE 197 34 747 A would be conceivable. The lower conveyor disk 44 is provided with an outer circumference with uniformly spaced teeth, where each third tooth is aligned with a tooth arranged at the root of the recess 46 of the upper conveyor disk 26. This lowest disk, the so-called driver disk 48 is provided with a number of hook-shaped drivers, distributed over its circumference, the drivers being shaped so as to lead in the direction of rotation and are angled downward in their outer region.

Figure 2:
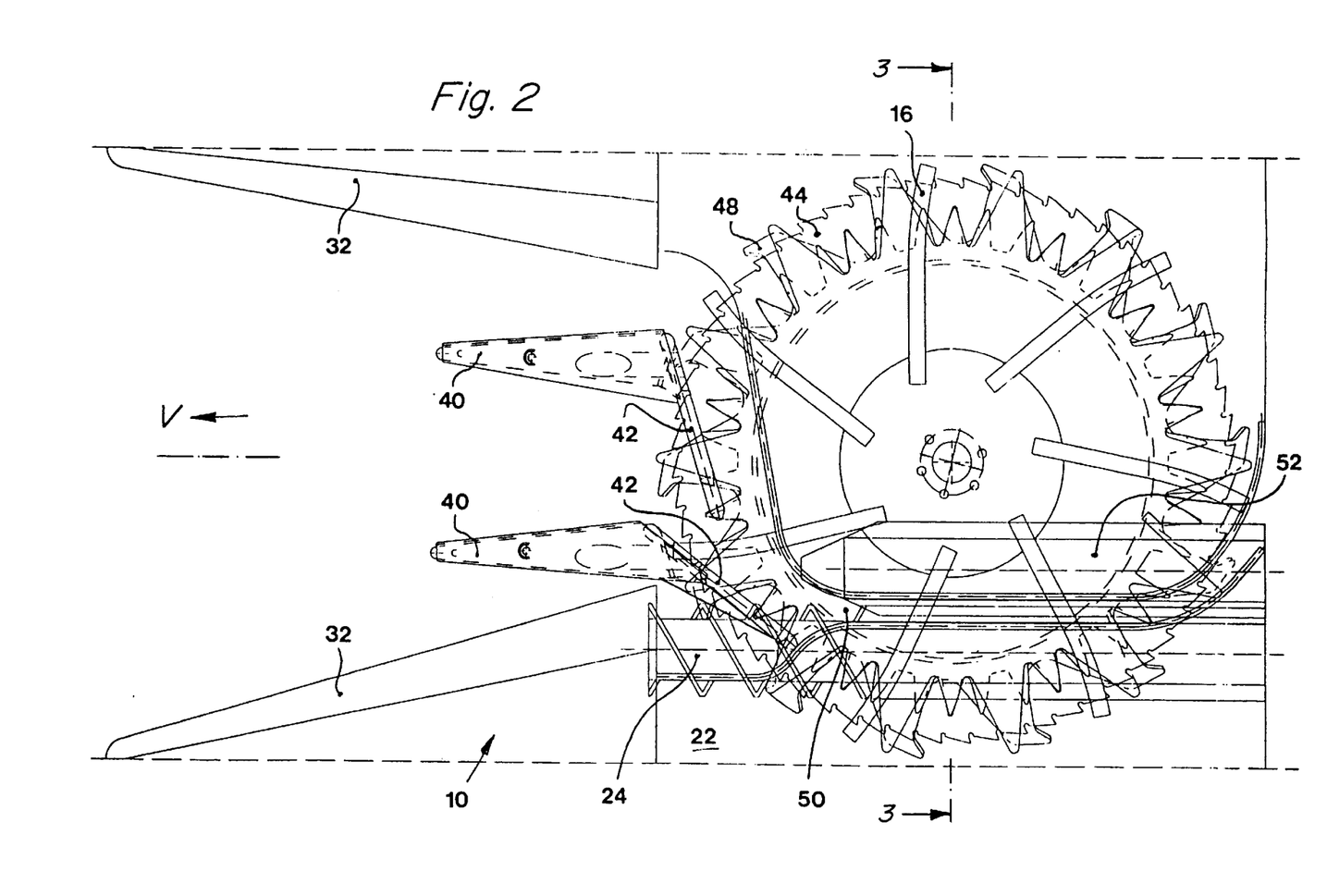
FIG. 2 is a top plan view of the intake and plucking arrangement of FIG. 1.
Figure 3:
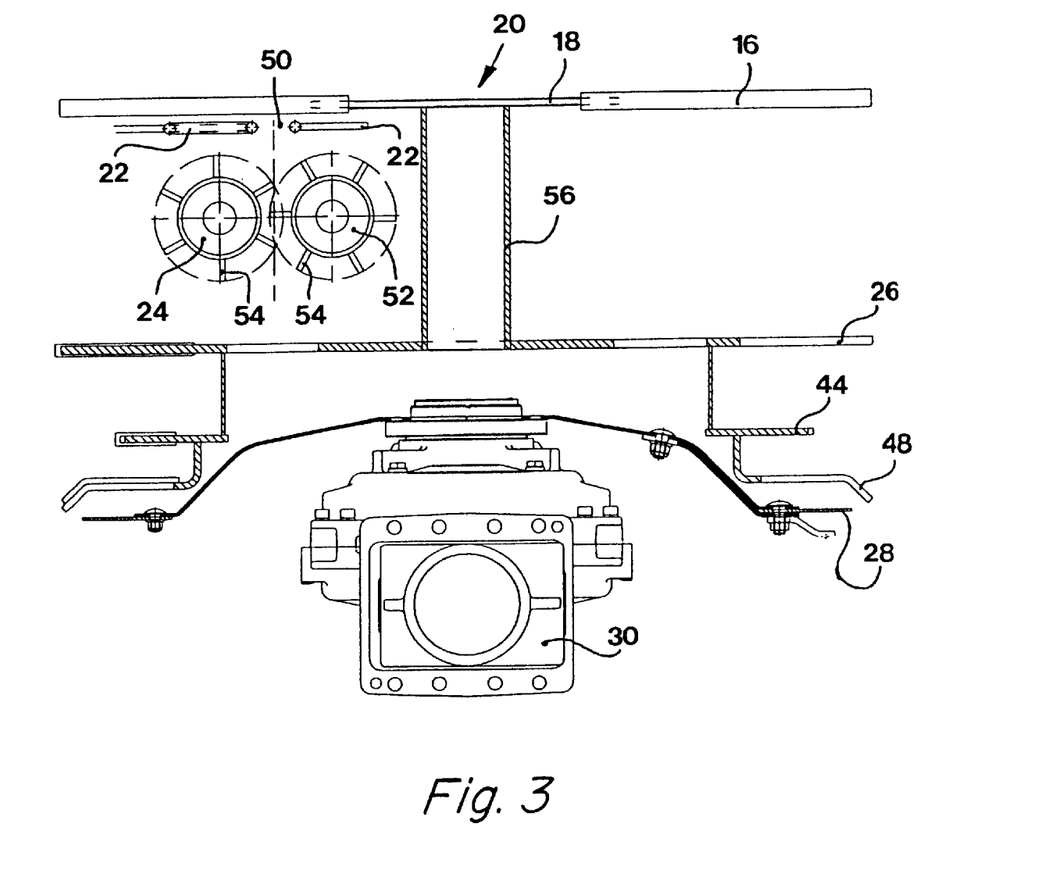
FIG. 3 is a vertical sectional view taken along line 3—3 of FIG. 2.

The driver disk 48, the lower conveyor disk 44 and the upper conveyor disk 26 are connected by a hollow shaft 56 with the disk 18 of the upper transport element 14 and are therefore arranged to rotate in the same direction and at the same rotational speed as the upper transport element 14, that is, in the counterclockwise direction about the vertical axis 20 as seen in FIG. 2. It would also be conceivable that the axis 20 be inclined slightly in the forward operating direction V. There are twice as many recesses 46 as there are fingers 16, although their numbers could coincide. The fingers 16 and the recesses 46 in the upper conveyor disk 44 form a sort of tapered notch, in which the stalk of a plant can be engaged and transported.

A gearbox 30 is used to drive the upper transport element 14, the lower conveyor disk 44 and the upper conveyor disk 26. The gearbox 30 is driven through elements, not shown, by a self-propelled harvesting machine. The gearbox 30 also brings into rotation a knife 28 rotating about the axis 20 arranged underneath the lower driver disk 48, the knife 28 rotating at a higher rotational speed that the transport element 14 and the conveyor disks 26 and 44.

The transport element 14 and the conveyor disk assembly is preceded in the forward operating direction V of the intake and plucking arrangement 10 to the left and the right by a stalk divider 32, each of which bend any plants standing to the side of the operating region of the intake and plucking arrangement 10 in the direction of its central axis, so that the plants can be grasped without any problem. Furthermore, the transport element 14 and the conveyor disk assembly are preceded by two divider points 40 that deflect the plants to the side. On the rear sides of the divider points 40, guide elements 42 are arranged that extend from the divider points 40 in the direction of rotation of the conveyor disk assembly, and are angled with respect to a tangent of the conveyor disassembly towards the direction of the axis of rotation 20. The guide elements 42 are straight and generally in the form of a circular cylinder. They extend approximately to the following divider point 40 or to the entrance of the plucking channel 50. The divider points 40 and the stalk dividers 32 define, in the intervening spaces remaining between them, intake and intersecting points, in which the plants can be grasped by the transport element 14 and the conveyor disk assembly, where the knife 28 cuts the plants from the stubble remaining on the field.

Figure 4:
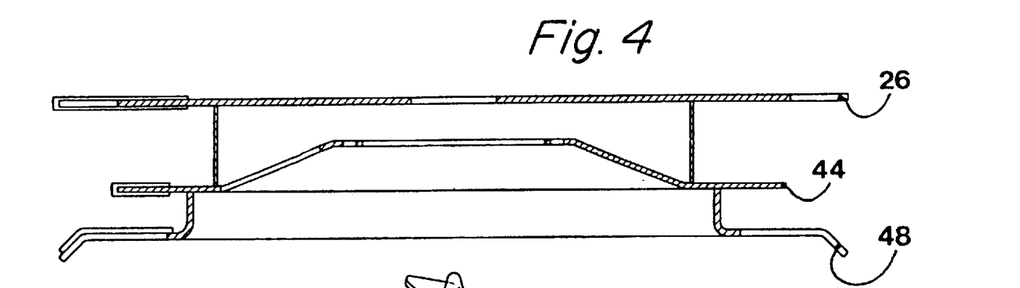
FIG. 4 is a vertical sectional view taken through the center of a conveyor disk assembly.

The plants grasped in this way are conveyed by the transport element 14 and the conveyor disks 26 and 44, and the driver disk 48, in the counterclockwise direction as seen in FIG. 4, and conducted to the plucking arrangement in a plucking channel 50, which is provided in a sheet-metal stripper vane 22. Over the greatest part of its length, the plucking channel 50 extends parallel to the direction of the forward movement V and is bent in its end region in the direction towards the axis 20. The horizontal sheet-metal stripper vane 22 is arranged in the vertical direction between the upper transport element 14 and the upper conveyor disk 26. A first plucking roll 24 and a second plucking roll 52 are positioned underneath the sheet-metal stripper vane 22 and above the upper conveyor disk 26. Between the first plucking roll 24 and the second plucking roll 52, a slot is defined that extends parallel to the plucking channel 50 and underneath the latter. Therefore, the longitudinal axes of the first plucking roll 24 and the second plucking roll 52 extend horizontally and parallel to the direction of forward movement V. The second plucking roll 52, that is arranged between the axis 20 and the first plucking roll 24, is provided with a forward point that is located ahead of the axis 20 with respect to the direction of forward movement V. The first plucking roll 24 is longer than the second plucking roll 52, but it is configured as a screw conveyor in its forward regions. Approximately at the level of the point of the second plucking roll 52, the first plucking roll 24 is provided with drivers 54 oriented radially that extend over the length of the plucking rolls 24 and 52, as is generally the entire second plucking roll 52, which can best be seen in FIG. 2.

The operation is performed as follows: Plants standing in the direction of forward operation V ahead of the intake and plucking arrangements 10 are deflected to the side, if necessary, by the stalk dividers 32 and/or the divider points 40 and reach in the intake and cutting locations defined between these, the upper transport element 14 and the upper conveyor disk 26 and the lower conveyor disk 44, as well as the driver disk 48. The plants are mowed by the knife 28.

The plants that come to lie against the leading surface of the fingers 16 of the upper transport element 14 are conveyed to the outside due to the rejecting conveying performance of the fingers 16 and come to lie in contact with the trailing surface of the same or of a following finger 16.

The plants are therefore conveyed, if need be, further in a slightly inclined position, but generally oriented vertically. By means of the guide elements 42, the stalks of the plants grasped by the upper conveyor disk 26 are forced into the roots of the recesses 46 of the upper conveyor disk 26 during the rotation of the conveyor disk assembly, so that they are clamped by the teeth of the upper conveyor disk 26 and the lower conveyor disk 44 and a safe transport of the plants is assured. In case they are grasped by the drivers of the driver disk 48, the lower ends of the plants slide radially inward along the surfaces of the drivers that are leading in the direction of rotation. As a result the plants are supported and retained by the disks of the conveyor disk assembly and the fingers 16 of the upper transport element 14.

As soon as the stalks of the plants come into contact with the forward edge of the sheet-metal stripper vane 22, they are conducted by its intake that narrows in a funnel shape into the plucking slot 50. At the beginning of the plucking slot 50, the screw conveyor of the first plucking roll 24 acts upon the plant and forces it to be drawn into the slot between the first plucking roll 24 and the second plucking roll 52. At that time the lower part of the plant that is still held in the recess 46 bends, since the circular path described by the root of the recess 46 extends outside the plucking slot 50. The plucking rolls 24 and 52 that rotate in opposite directions draw the plants downward between them, and act to clear the conveyor disk assembly, where the pointed forward region of the second plucking roll 52 supports the clearing. Simultaneously, the fingers 16 of the upper transport element 14 transports the plant over the length of the plucking channel 50 opposite to the direction of forward operation V to the rear, where a subsequent finger 16 transport, if need be, the plants previously in contact with the trailing surface of a leading finger 16. Therefore, the length of the fingers 16 of the upper transport element 14 is such that the fingers 16 are long enough to grasp the plants at the intake and intersection point, and that the intervening space remaining between each of two fingers 16 covers the entire plucking channel. Useful components of the plants such as ears, heads of sunflowers or other fruit are retained by the sheet-metal stripper vane 22, and thereby separated from the remainder of the plant. The useful components are pushed into a trough 36 by the fingers 16 and by the following useful components. There they reach the operating region of a first screw conveyor 34, which conducts them in a sideways direction to a harvesting machine or the like.

Figure 6:
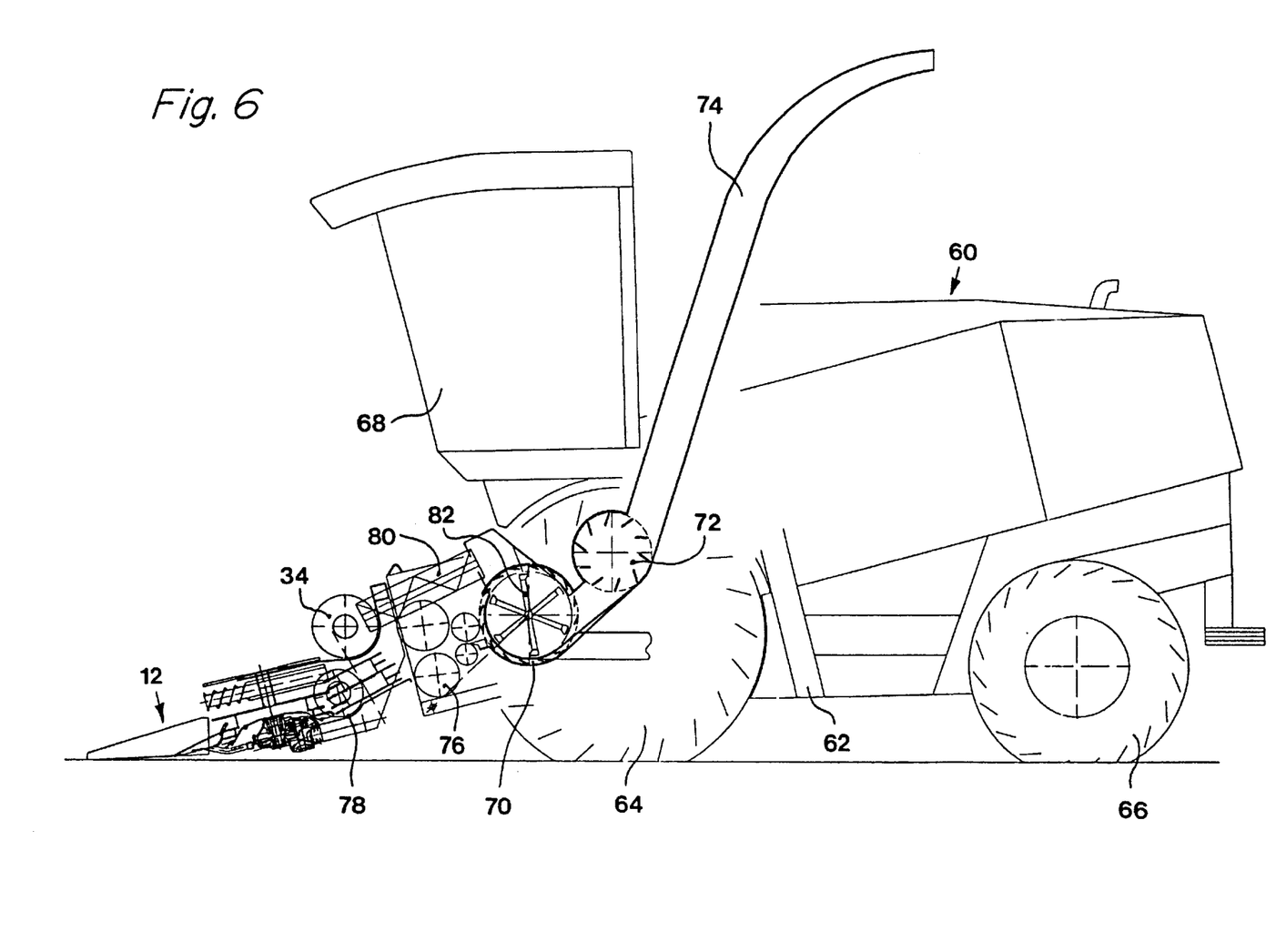
FIG. 6 is a schematic left side elevational view of a self-propelled forage harvester equipped with a crop recovery arrangement having intake and plucking arrangements according to the present invention.
Figure 7:
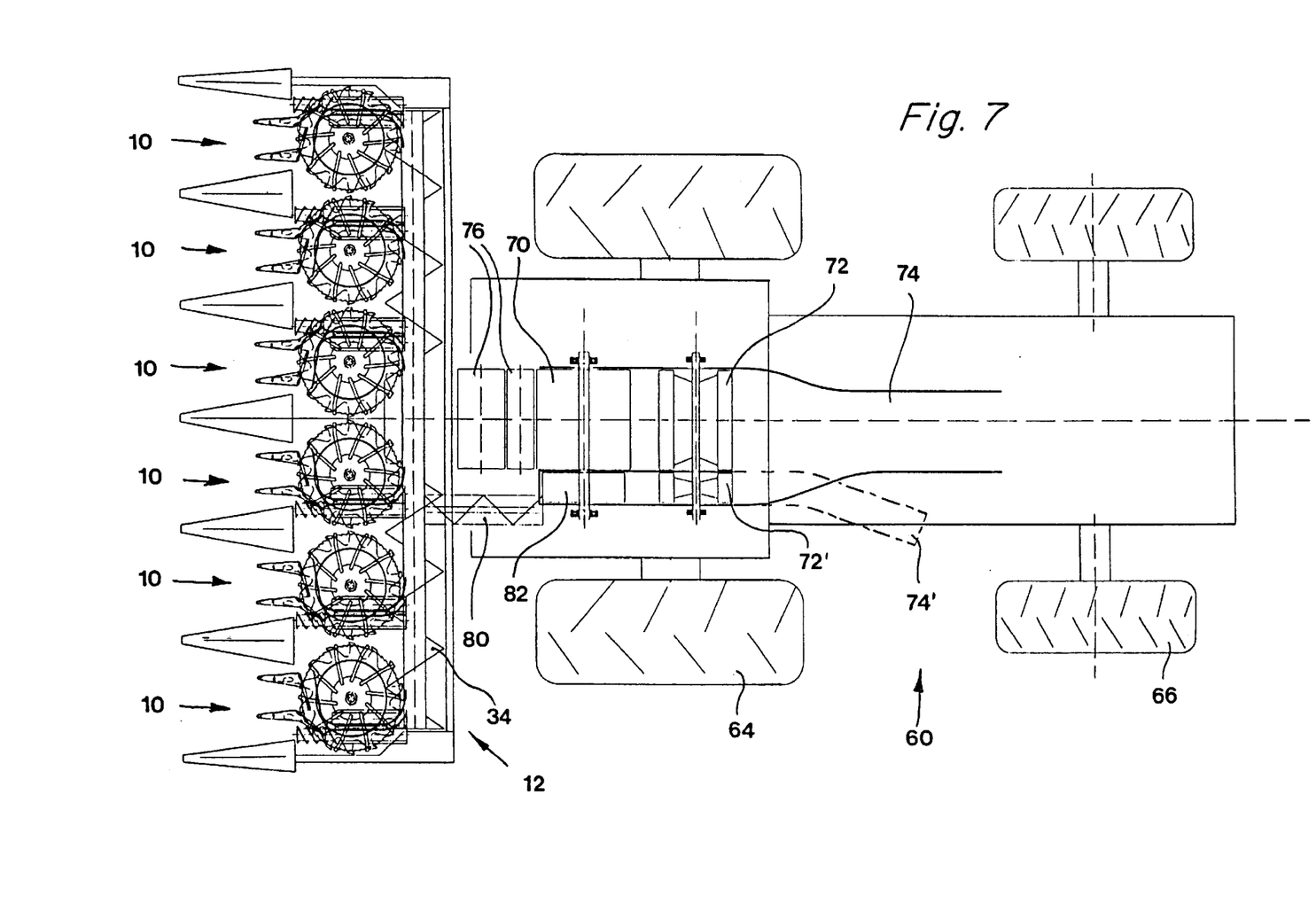
FIG. 7 is a top plan view of the forage harvester shown in FIG. 6.

Simultaneously, the remainder of the plants are conducted by the plucking rolls 24 and 52 in a channel 38 underneath the first screw conveyor 34 in which a second screw conveyor 80, shown in FIGS. 6 and 7, or any desired other conveyor, such as a belt conveyor, conducts the plants to a harvesting machine. It would also be conceivable to dismember the plants by means of appropriate cutting elements of the plucking rolls 24 and 52 or a separate chopper and/or to deposit them directly onto the field, without transferring them to a conveyor.

A harvesting machine 60 shown in FIG. 6 in the form of a self-propelled forage harvester is supported on a frame 62 that is carried by front and rear wheels 64 and 66, respectively. The harvesting machine 60 is operated from an operator's cab 68, from which a crop recovery arrangement 12 can be controlled while viewed by the operator.

The crop recovery arrangement 12 is equipped with a total of six intake and plucking arrangements 10 that are arranged alongside each other, so that two different streams of crop are conveyed to the harvesting machine 60. The remains of the plants are conducted to the center of the crop recovery arrangement 12 by a second screw conveyor 78 (FIG. 6) that is arranged in the channel 38 (see FIG. 1). There they are conducted by two pairs of intake rolls 76 to a conventional chopper drum 70, that chops them into small pieces and delivers them to a conveying arrangement 72. The chopped plant remains leave the harvesting machine 60 to an accompanying trailer through a discharge duct 74 that is mounted for pivoting about an upright axis.

As can be seen in particular from the schematic plan view shown in FIG. 7, the useful components of the plants, that were separated by means of the plucking arrangement from the remainder of the plants, are conducted by means of the first screw conveyor 34 and a third screw conveyor 80 that extends transverse to the former, in another stream of crop to a reducing arrangement in the form of a hammermill 82 which is arranged alongside and coaxial to the chopper drum 70. The hammermill 82 consists of arms rotating about a horizontal axis, hammers are attached to the ends of the arms so as to move as a pendulum, which separate the kernels from the corn ears and shatter them by interacting with a friction surface (not shown in the drawing) provided on a housing wall of the reducing arrangement. The use of the hammermill eliminates the need for a kernel processor used to break the kernels in the state of the art. The energy demand of the harvesting machine 60 is reduced considerably, since the power requirement of the hammermill is lower than that of a kernel processor. The reduced useful components of the plants are conducted through a conveying arrangement 72', arranged alongside and coaxial to the conveying arrangement 72, to a discharge duct 74'. As is the discharge duct 74, the discharge duct 74' may be configured so as to rotate separately, in order to conduct the crop to another accompanying trailer or to another, separate container of the same trailer. It is also conceivable that the streams of crop of the plant remains and useful components of the plants are again combined downstream of the chopper drum 70 or the hammermill 82, in order to produce, for example, total plant silage.

As can be seen from FIG. 7, the intake and plucking arrangements 10 are configured symmetrically to each other on both sides of the longitudinal centerline of the harvesting machine 60; the upper transport elements 14 and the conveyor disk assemblies of the three right-hand intake and plucking arrangements 10 shown at the top in FIG. 7 rotate in the clockwise direction while the other three intake and plucking arrangements rotate in the opposite direction.

What is claimed is:

1. In a crop harvesting head including a plurality of intake and plucking arrangements located in side by side relationship to each other, with each intake and plucking arrangement including an intake arrangement including at least one conveyor disk mounted for rotating about an upright axis and including teeth disposed for the grasping of stalks of plants having fruit attached thereto in order to cause the plants to move along a desired path, a plucking arrangement located in said path for separating the fruit from the stalk of each plant, and an upper transport element located above and mounted for rotation adjacent said at least one conveyor disk, the improvement comprising: said transport element being mounted for rotation with said at least one conveyor disk and including at least one leading surface being shaped such that it has a rejecting conveying characteristic.

2. The crop harvesting head defined in claim 1 wherein said transport element is so sized and located relative to said plucking arrangement that it spans a zone located vertically above said plucking arrangement.

3. The crop harvesting head defined in claim 2 wherein said transport element includes a plurality of generally radially extending fingers; and each finger having an outer portion that is bent in the trailing direction with respect to the direction of rotation of the upper transport element, whereby each finger has a leading surface having a rejecting conveying characteristic resulting in plant stalks, that reach a region where the bent portion of the finger operates, being deflected outward and not drawn inward, and a trailing surface having an aggressive conveying characteristic resulting in those of said stalks which may be slightly inclined relative to vertical being drawn inward and transported.

4. The crop harvesting head as defined in claim 1 wherein said at least one conveyor disk is a lower conveyor disk; and an upper conveyor disk being arranged above said lower conveyor disk and below said transport element.

5. The crop harvesting head as defined in claim 4 wherein said upper transport element operates in the same direction of operation and at the same rotational speed as said upper and lower conveyor disks.

6. The crop harvesting head as defined in claim 4 wherein said upper and lower conveyor disks are each provided with teeth, defining recesses between them, for grasping and retaining the stalk of a plant.

7. The crop harvesting head as defined in claim 6 wherein said teeth of said upper conveyor disk include first and second sets of teeth spaced angularly about a periphery of said upper conveyor disk, with said first set of teeth being larger in length radially than said second set of teeth; and each recess defined by adjacent teeth of said first set of teeth having a root from which a tooth of said second set of teeth projects.

8. The crop harvesting head as defined in claim 1 and further including a rotating knife located below and mounted for rotation about said upright axis of each intake and plucking arrangement; and said rotating knife being adapted for rotating at a rotational speed higher than that of said conveyor disk.

9. The crop harvesting head as defined in claim 1 wherein each plucking arrangement is mounted alongside a respective intake arrangement with respect to a forward direction of travel of the harvesting head.

10. The crop harvesting head as defined in claim 1 wherein said plucking arrangement includes an entrance located along said desired path at a location ahead of, and to one side of, said upright axis of each conveyor disk of each intake and plucking arrangement.

11. The crop harvesting head as defined in claim 10 wherein each intake and plucking arrangement includes a stripper vane defining a plucking channel having a fore-and-aft extending section; and said plucking arrangement including at least one plucking roll arranged below and in parallel relationship to said fore-and-aft extending section of said plucking channel.

12. The crop harvesting head as defined in claim 11 wherein said at least one plucking roll includes a forward end section in the form of a screw for engaging a plant and conveying it rearwardly into said plucking channel.

13. A self-propelled forage harvester, comprising: a harvesting head including at least one intake and plucking arrangement for cutting plants from the ground and for separating fruit from a remaining portion of the plant; first and second conveyor arrangements respectively located for separately conveying said fruit and remaining portions of the plants to first and second crop processing arrangements carried by said harvester rearward of said harvesting head; said first crop processing arrangement being a hammermill and said second crop processing arrangement being a cutterhead.

* * * * *

UNITED STATES PATENT AND TRADEMARK OFFICE
CERTIFICATE OF CORRECTION

PATENT NO. : 6,430,907 B2  Page 1 of 1
APPLICATION NO. : 09/731378
DATED : August 13, 2002
INVENTOR(S) : Wolters et al.

It is certified that error appears in the above-identified patent and that said Letters Patent is hereby corrected as shown below:

Title page, item (73) delete, "Deere & Company" and replace with --Maschinenfabrik Kemper GmbH & CO KG Breul (DE)--.

Signed and Sealed this

Fourteenth Day of November, 2006

JON W. DUDAS
*Director of the United States Patent and Trademark Office*